United States Patent [19]
Uragami et al.

[11] Patent Number: 5,673,058
[45] Date of Patent: *Sep. 30, 1997

[54] ONE-CHIP SEMICONDUCTOR INTEGRATED CIRCUIT DEVICE CAPABLE OF OUTPUTTING ANALOG COLOR SIGNAL OR DIGITAL COLOR SIGNAL

[75] Inventors: Akira Uragami; Shinichi Kojima, both of Takasaki, Japan

[73] Assignee: Hitachi, Ltd., Tokyo, Japan

[*] Notice: The term of this patent shall not extend beyond the expiration date of Pat. No. 5,515,068.

[21] Appl. No.: 621,753

[22] Filed: Mar. 22, 1996

Related U.S. Application Data

[63] Continuation of Ser. No. 300,065, Sep. 2, 1994, Pat. No. 5,515,068, which is a continuation of Ser. No. 87,028, Jul. 6, 1993, abandoned, which is a continuation of Ser. No. 818,729, Jan. 6, 1992, abandoned, which is a continuation of Ser. No. 423,794, Oct. 18, 1989, abandoned.

[30] Foreign Application Priority Data

Oct. 31, 1988 [JP] Japan .................................. 63-276680

[51] Int. Cl.⁶ ..................................................... G09G 5/00
[52] U.S. Cl. ............................................ 345/3; 345/150
[58] Field of Search ...................................... 345/1, 3, 150, 345/22, 151, 153, 147, 199; 365/149

[56] References Cited

U.S. PATENT DOCUMENTS

| | | |
|---|---|---|
| 3,947,840 | 3/1976 | Craford et al. . |
| 4,122,444 | 10/1978 | Kitajima et al. . |
| 4,638,309 | 1/1987 | Ott . |
| 4,751,502 | 6/1988 | Ishii et al. . |
| 4,799,193 | 1/1989 | Horiguchi et al. . |
| 4,808,989 | 2/1989 | Tabata et al. . |
| 4,980,678 | 12/1990 | Zenda . |
| 4,998,100 | 3/1991 | Ishii . |
| 5,515,068 | 5/1996 | Uragami et al. .......................... 345/150 |

OTHER PUBLICATIONS

Chapter 6, "An Example of Good Circuit Design Using the HD63484 and Its Support LSI", pp. 1–32 undated.

*Primary Examiner*—Regina D. Liang
*Attorney, Agent, or Firm*—Fay, Sharpe, Beall, Fagan, Minnich & McKee

[57] ABSTRACT

A semiconductor device (CPLT) of the invention comprises a first terminal (R) to which analog data is to be supplied, a digital/analog converter (DAC1) with its output coupled to the first terminal, a second terminal (R'0) to which digital data is to be supplied, a digital output circuit (DOB) with its output coupled to the second terminal, and a preparation circuit (PLM, SEL) which is coupled to respective inputs of the digital/analog converter and the digital output circuit. The preparation circuit prepares digital data to be processed (RR) for any one of input of the digital/analog converter and input of the digital output circuit.

9 Claims, 7 Drawing Sheets

(UNIT SELECTION CIRCUIT)

MC
MEMORY CELL

ONE-CHIP SEMICONDUCTOR INTEGRATED CIRCUIT DEVICE CAPABLE OF OUTPUTTING ANALOG COLOR SIGNAL OR DIGITAL COLOR SIGNAL

This application is a continuation of allowed U.S. application Ser. No. 08/300,065 U.S. Pat. No. 5,515,068, filed on Sep. 2, 1994, which was a file wrapper continuation of U.S. application Ser. No. 08/087,028 filed on Jul. 6, 1993 now abandoned which was a file wrapper continuation of U.S. application Ser. No. 07/818,729, filed on Jan. 6, 1992 now abandoned, which was a file wrapper continuation of U.S. application Ser. No. 07/423,794, filed on Oct. 18, 1989 is now abandoned.

BACKGROUND OF THE INVENTION

The present invention relates to a semiconductor integrated circuit device to be utilized in a color palette device generating color pixel signals for a color display.

A personal computer, such as a laptop type using a panel display such as a liquid crystal display or plasma display, is required as a part of its function to allow connection to a CRT (cathode ray tube) color display of a desktop type personal computer. The color palette device forming a color pixel signal for the CRT color display can not control a panel display as described above because it only outputs analog color signals of R (red), G (green), and B (blue) which may be subjected to digital/analog conversion. The pixel signal for driving the panel display is a digital color signal, and cannot utilize the analog color signals. Consequently, when the panel display is driven using the color palette device, which outputs only analog color signals, an additional circuit such as an analog/digital converter becomes necessary. This causes the number of parts of a board for color display to be increased and the circuit system constitution to be complicated.

Also, since a laptop type personal computer is often driven by a battery, it must have low power consumption. Consequently, the digital/analog converter to be used for the CRT color display must be at a low power consumption state when not being used. However, if the operation voltage of the A/D converter is interrupted completely it becomes difficult to use the converter in such a state and a rise in standby time of the circuit becomes necessary.

In "Transistor Technology", January 1987, published by CQ Publication Company on Jan. 1, 1987, reference titled "Design of ACRTC graphic board (1)" from page 402 to page 411, particularly at pages 410 and 411, a circuit diagram of ACRTC graphic board using a color palette device Bt-450 is disclosed. The board comprises two graphic video attribute controllers (HD63486CP) U5 and U6 for receiving frame data from sixteen frame buffer memories (HM504464) M1 through M16, for generating video outputs, a color palette device (Bt-450) U8, for receiving the video outputs at its inputs P0 through P3, and outputs $IO_R$, $IO_G$, and $IO_B$ connected to an analog connector P2, and a digital output connector P3 for receiving the video outputs. When the digital output connector P3 of the board is connected to the color panel display, a problem exists in that color of the color figure on the color panel display cannot be simply changed.

SUMMARY OF THE INVENTION

An object of the invention is to provide a semiconductor integrated circuit device having a functional block selectively rendered to an operation state in response to an operation mode under low power consumption.

Another object of the invention is to provide a semiconductor integrated circuit device having a color palette function to realize low power consumption and multiple functions.

The foregoing and other objects and novel features of the invention will become clear from the description of the specification and the accompanying drawings.

An outline of a typical embodiment of the invention disclosed in the present application is briefly described as follows. A semiconductor device of the present invention includes plural functional blocks rendered to an operation state alternatively in response to an operation mode. When the functional blocks are rendered to a non-operation state, their output circuits coupled at least to the external terminal are placed into a high impedance state.

According to the above-mentioned arrangement when the output circuit, where the flowing of a relatively large current is necessary to drive a relatively large load is placed into a non-operation state, a high impedance state is implemented, thereby reducing power consumption in the non-operation state.

Also, a semiconductor device (CPLT) of the invention comprises a first terminal (R) to which analog data is to be supplied, a digital/analog converter (DAC1) with its output coupled to the first terminal, a second terminal (R'O) to which digital data is to be supplied, a digital output circuit (DOB) with its output coupled to the second terminal, and a preparation means (PLM, SEL) coupled to respective inputs of the digital/analog converter and the digital output circuit and preparing digital data (RR) to be processed either to the input of the digital/analog converter or to the input of the digital output circuit.

Since the semiconductor device is constructed to enable driving of an analog input device (analog CRT display) by analog data, and a digital input device (panel display) by digital data, multiple functions of the semiconductor device can be attained. Consequently, when the invention is applied to a color palette device, an additional circuit for converting analog signals into digital signals can be removed which was required in the prior art. Therefore, the number of parts of the color display board can be reduced and the area of the board can be reduced. Further, since the board area can be reduced a system in which the board is used, for example a personal computer or an engineering workstation, can be miniaturized. Particularly, if the color palette device according to the invention is applied to a personal computer of the laptop-type large miniaturization is obtained.

DESCRIPTION OF THE PREFERRED EMBODIMENTS

The invention will now be described using the accompanying drawings.

Figure 1A:
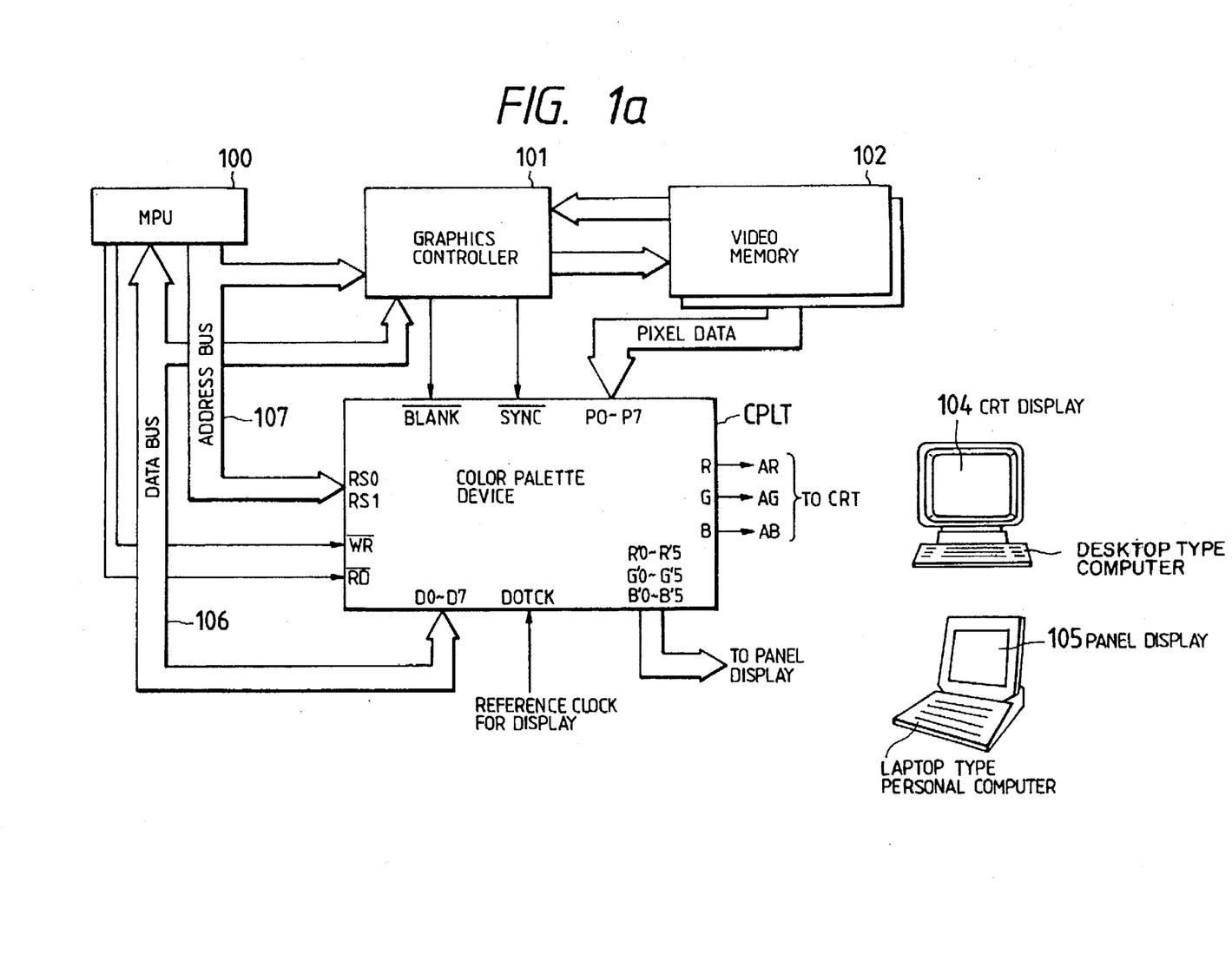
FIG. 1(a) is a system diagram illustrating a color display system using a color palette device to which the invention is applied.
Figure 1B:
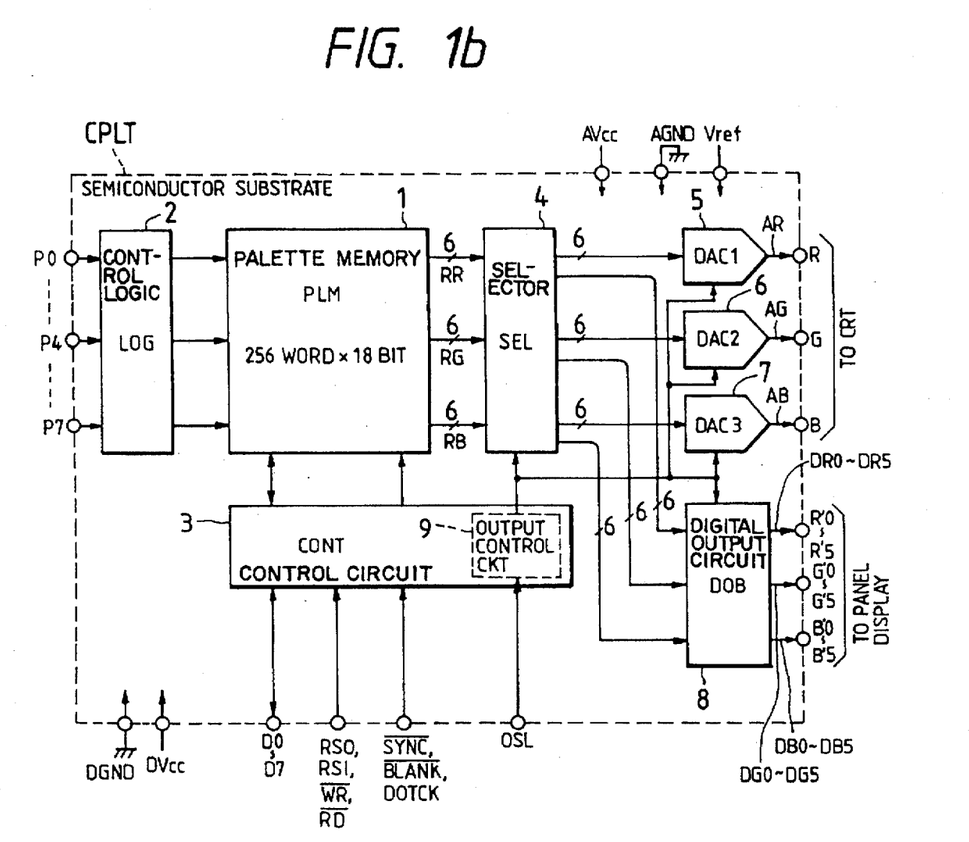
FIG. 1(b) is a block diagram illustrating an embodiment of a digital output circuit to be applied to the invention.

FIG. 1(a) is a diagram of an image processing system using a color palette device CPLT to which the invention is applied, and FIG. 1(b) is a block diagram of the color palette device (CPLT).

As shown in FIG. 1(a), the image processing system (board) comprises a microprocessor (MPU) 100, a graphic controller 101, a video memory (frame memory) 102, and a color palette device CPLT which can be connected alternatively to an analog CRT (cathode ray tube) display 104 or a panel display 105.

The microprocessor 100 is mutually connected to the graphic controller 101 and the color palette device CPLT through a data bus 106 and an address bus 107, and performs the operation control of the graphic controller 101 and the color palette device CPLT. The microprocessor 101 may utilize a microprocessor such as HD641016 or HD642032 from Hitachi, Ltd.

The graphic controller 101 may utilize a CRT controller with graphic drawing and display function, for example, an advanced CRT controller (Advanced CRT Controller: ACRTC) such as HD63484 a raster scan type from Hitachi, Ltd. That is, in the case of a display operation where image data already stored in the video memory 102 is displayed on the CRT display, the graphic controller 101 generates a display address to perform access (display access) of the video memory 102 in synchronization with the display timing of the CRT display. Further, in the case of a drawing operation where the image data already stored in the video memory 102 is rewritten, the graphic controller 101 generates a drawing address to identify the drawing command supplied from the MPU 100 and to perform access (drawing access) of the video memory 102. In the case of the drawing operation, the graphic controller 101 can execute both read operation of the image data stored in the video memory 102 and write operation of the image data to be written in the video memory 102.

The graphic controller 101 generates various synchronizing signals for display, such as horizontal synchronizing signal $(\overline{HSYNK})$ and vertical synchronizing signal $(\overline{VSYNC})$ (hereinafter referred to as "horizontal/vertical synchronizing signal $(\overline{SYNC})$") required to display the pattern to the CRT display 104 or display timing clock $\overline{DISP}$ (not shown).

The video memory 102 outputs pixel data of 8 bits by one display address supplied from the graphic controller 101.

The color palette CPLT at its pixel data input terminals P0-P7 receives pixel data (display data) of 8 bits outputted from the video memory 102, and outputs color data with an address corresponding to the pixel data of 8 bits from the analog color signal output terminals R, G, and B or the digital color signal output terminals R'0-R'5, G'0-G'5, B'0-B'5. That is, the video memory 102 stores the address data as pixel data to access the memory array address data as pixel data to access the memory array installed in the color palette CPLT. The color palette CPLT internally holds the color data of $(2^8)=256$ words. Consequently, the CRT picture plane of the analog CRT display 104 can display 256 colors simultaneously. Each of the color data of the 256 colors is constituted by digital color information of 18 bits, including information of a red color of 6 bits, a green color of 6 bits, and a blue color of 6 bits.

When the analog CRT display 104 is driven by this system, if the pixel data from the video memory 102 is inputted to the color palette CPLT, the digital color information of 18 bits stored in the address in accordance with the pixel data is read, and the information of red, green, and blue, respectively in 6 bits, is converted from digital signals into analog signals by the corresponding digital/analog converter in the color palette CPLT and the converted signals are outputted from the analog color signal terminals R, G, and B. The analog color signals AR, AG, and AB outputted from the analog color signal output terminals R, G, and B are supplied to the analog CRT display of the desktop type personal computer.

On the other hand, when the panel display 105 is driven by the system, the digital color information of 18 bits corresponding to the pixel data supplied from the video memory 102 is outputted directly from the external terminals R'0-R'5, G'0-G'5, B'0-B'5 without passing through the digital-analog converter.

When the display plane of the analog CRT display 104 includes, for example, 400 scanning lines (raster) each constituted by 640 dots, the color palette CPLT outputs the analog color signals AR, AG, and AB on time to the display of one dot of the display plane. Consequently, the output operation of the analog color signals AR, AG, and AB is synchronized with the display timing of the CRT display 104. That is, the video memory 102 is accessed by the graphic controller 101 in synchronization with the display timing of the analog CRT display 104 to supply the pixel data to the color palette CPLT in synchronization with the display timing. The color palette CPLT supplies the analog color signals AR, AG, and AB to the display 104 in synchronization with the display timing.

When the horizontal display time and the vertical display time of the analog CRT display 104 are made 30.4 μs and 16.11 ms, respectively, since the display time of one dot is made 30.4 μs÷640 dots=475 ns=21.05 MHz, a dot clock of 21.05 MHz is inputted to the dot clock terminal DOTCK of the color palette CPLT from an oscillation circuit (not shown). The horizontal/veritcal synchronizing signal $\overline{SYNC}$ output from the graphic controller 101 is supplied to the synchronizing signal terminal $\overline{SYNC}$ of the color palette CPLT. Consequently, the analog color signals AR, AG, and AB are supplied to the CRT display 104 in synchronization with the synchronizing signal SYNC and the dot clock. The display access operation speed of the color palette CPTL is made 80-150 MHz, for example.

On the other hand, the color palette CPTL can convert the digital color information stored internally in response to the command from the MPU 100. That is, the color palette CPLT stores the color information of 256 colors as described above, and the color information of 256 colors is selected among colors of 260 thousands ($2^{18}$) by the MPU 100. Consequently, the MPU 100 executes rewrite of the digital color information of 18 bits in the color palette CPLT if necessary. The change operation of the color information need not be synchronized with the display time of the CRT display 104 but may be synchronized with the operation speed, for example 1-10 MHz, of the MPU 100. The color information rewrite operation is executed when the register selection signal, read control signal, and write control signal supplied from the CPU 100 and rewrite address and rewrite color data supplied through the data bus DB are received respectively to the external terminals RS0, RS1, $\overline{WR}$, $\overline{RD}$ and D0-D7.

Next, the color palette device CPLT will be described using FIG. 1(b). In FIG. 1(b), the part surrounded by the dotted line shows one semiconductor substrate such as single crystal of silicon and the color palette device (semiconductor integrated circuit) CPLT is integrated and formed on the semiconductor substrate using bipolar CMOS process technology.

The color palette device CPTL includes a palette memory PLM 1. The palette memory (memory array) PLM 1 has memory capacity of 256 words×18 bits. Storage area of one word is divided into red information of 6 bits, blue information of 6 bits, and green information of 6 bits. If the storage area of one word is accessed by a control logic LOG 2 as hereinafter described, the palette memory PLM 1 outputs information of red, green, and blue, RR, RG and RB, each having 6 bits, to a selector 4 as hereinafter described. Each memory cell in the palette memory PLM 1 is made a static memory cell of a known dual port type. Each address (word) of the palette memory PLM 1 stores color data corresponding to each color pixel signal. Consequently, the pixel data corresponding to an address of the palette memory is stored to a frame memory 102 where image data is stored, thereby the pixel data stored in the frame memory 102 can be converted into color pixel signal. Inversely, the color data stored in the palette memory PLM 1 is rewritten by the microprocessor (MPU) 100, thereby color of the displayed pattern can be changed simply.

The control logic LOG 2 receives the pixel data read from the frame memory 102 in synchronization with raster scan timing of the CRT (cathode ray tube) through the external terminals P0-P7, and performs access of the palette memory PLM 1 using the pixel data as address information. That is, the control logic LOG 2 is deemed to include an address decoder circuit for the display operation.

The control circuit CONT 3 receives a display horizontal/ vertical synchronizing signal, blank input signal for rendering analog color signals of digital/analog converters 5, 6, and 7 to blank level, and display timing signals such as display reference clock (dot clock) respectively from external signals $\overline{SYNC}$, $\overline{BLANK}$, DOTCK, and performs the timing control of the display output signals.

The control circuit CONT 3 further controls the read/write mode of the palette memory PLM 1 for changing the digital color information in the palette memory PLM 1. When the digital color information of a specific address in the palette memory PLM 1 is changed, control circuit CONT 3 receives address signals corresponding to the specific address at external terminals D0-D7, a write operation control signal to command the write mode at an external terminal $\overline{WR}$, and register selection signals for selecting an address register to store the address signals supplied from the external terminals D0-D7 at external terminals RS0, RS1, respectively, and acts to take the address signals into the address register. Then the digital color information to be written in the palette memory PLM 1 includes the digital information of red information of 6 bits, green information of 6 bits, and blue information of 6 bits to one address, the information of red, green, and blue is supplied every 6 bits in the time division to the external terminals D0-D5, and stored in the corresponding information registers of red, green, and blue. The information of red, green, and blue in 18 bits is written together to the address of the palette memory PLM 1 corresponding to the address signal in the address register. The address register and the information registers of red, green, and blue are deemed to be included in the control circuit CONT 3. Further, the operation control signal, the address signal and the information of red, green, and blue to be written in the palette memory PLM 1 are supplied from the microprocessor 100. In addition to the access control of the palette memory 1, as described above, the control circuit CONT 3 performs the following operation control.

In the embodiment, both output functions corresponding to display by the CRT color display and the panel display are provided. That is, the color palette device outputs analog color signals (AR, AG, AB) for the CRT color display to external terminals R, G, and B and digital color signals DR0-DR5, DG0-DG5, DB0-DB5 (hereinafter simply referred to as DR', DG', and DB', respectively) to external terminals R'0-R'5, G'0-G'5 and B'0-B'5, respectively. The selector SEL 4 transmits the read color data RR, RG, RB each having 6 bits from the palette memory PLM 1 to the digital/analog converters 5, 6, and 7 (DAC1 through DAC3) and the digital output circuit DOB 8 in response to the display operation mode.

The digital/analog converters DAC1 through DAC3 respectively form analog color signals AR, AG, AB for the CRT color display. The digital output circuit DOB outputs digital color data DR', DG', DB' which can be utilized in color (or monochromatic) gradation display required for the panel display. Further, the data DR', DG' and DB' are converted into drive signals displayed in gradation corresponding to the drive system of the panel display to be driven by a gradation display controller (not shown), and supplied to the panel display. The output selection operation of the control circuit CONT 3 is performed in that level of the output selection signal to be supplied to the external terminal OSL is identified by the output control circuit 9.

In the present embodiment, although not particularly limited thereto, the output control circuit 9 includes an output control register (or latch circuit) which stores the output selection signal supplied to the external terminal OSL from the microprocessor 100, and the level of the stored output selection signal is transmitted to the selector SEL 4, the A/D converters 5, 6 and 7 DAC1-DAC3, and the digital output circuit DOB 8. When the output control circuit 9 is removed from the color palette device CPLT to improve the integration degree of the color palette device and simplification of the output selection operation, the external terminal OSL is connected either to the power source voltage Vcc of the system or to the ground potential GND. For example, when the output signals AR, AG and AB from the output terminals R, G, B are applied to the color CRT display, in general, input of the CRT display and analog color output of the image processing board including the color palette device are connected using a connector. Also input of the panel display and digital color output of the image processing board including the color palette device are connected using a connector.

Consequently, paying attention that the analog color output and the digital color output of the image processing board are utilized in an alternative way, for example, when the connector is connected to the digital color output of the board, the potential of the external terminal OSL may be controlled to such potential that the digital data DR', DG' and DB' are outputted from the color palette device.

The digital/analog converters DAC1 through DAC3 and the digital output circuit DOB 8 are rendered to the operation state in response to the respective operation modes, i.e., the CRT color display or the panel display. In one embodiment, the semiconductor integrated circuit device for the color palette is directed to the laptop type personal computer using the panel display, although not particularly limited thereto. Consequently, the display operation by the panel display is performed at the normal operation, and the display operation by the CRT color display of the desktop type personal computer is possible as an optional function. In the laptop type personal computer as above described, since a battery drive is assumed, a low consumption power state is necessary. Consequently, the control circuit CONT also performs the control operation so that the digital/analog converters DAC1 through DAC3 or the digital output circuit DOB being in non-operation in response to the display operation modes are rendered to the non-operation state. The selector SEL4 transmits the color data of the palette memory PLM1 in response to the selective operation of the analog and digital output circuits.

Figure 2:
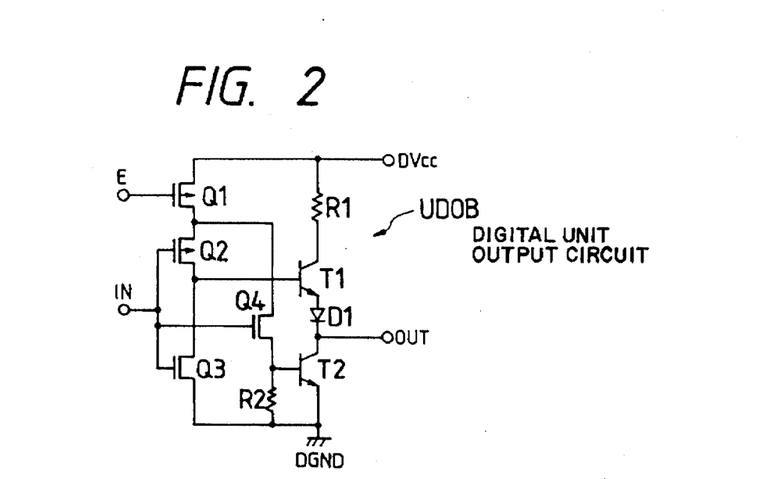
FIG. 2 is a circuit diagram illustrating an embodiment of a digital unit output circuit to be applied to the invention.

FIG. 2 is a circuit diagram of an embodiment of a part (digital unit output circuit UDOB) of the digital output circuit DOB.

The digital unit output circuit UDOB is a combination of a CMOS circuit and bipolar transistors, and the CMOS circuit is used as an input stage and the bipolar transistors are used as an output stage. The input stage supplies output enable signal E to the gate of P-channel MOSFET Q1, and supplies the digital power source voltage Vcc to a CMOS inverter circuit comprising P-channel MOSFET Q2 and N-channel MOSFET Q3 receiving input signal IN through the P-channel MOSFET Q1. N-channel MOSFET Q4 is supplied with the operation voltage through the MOSFET Q1 and supplied with the input signal IN at its gate, and constitutes a source follower circuit where a load resistor R2 is installed at its source. DGND designates the digital ground potential.

The output stage constitutes a totem pole type output circuit with the base of a transistor T1 forming an output signal of a high level connected to an output terminal of the CMOS inverter circuit, and the base of a transistor T2 is supplied with the source output of the MOSFET Q4. A current limiting resistor R1 is installed at the collector of the transistor T1, and a level shifting diode D1 is inserted to its emitter.

In the digital unit output circuit UDOB, if the enable signal E is at a high level, since the P-channel MOSFET Q1 is turned off and the base current of the transistors T1 and T2 is interrupted, the output terminal OUT becomes the high impedance state and the power consumption can be made zero.

In this constitution, since current amplification factor (hfe) of the transistors T1, T2 is as large as about 100, the P-channel MOSFET Q1 may interrupt the very small base current being 1/100 of the output current and therefore can be constituted by relatively small size.

Further in the digital unit output circuit UDOB, when the enable signal E is at a low level and the circuit is rendered to the operation state, since the rise waiting time of bias does not exist, the circuit can be operated at high speed in response to the low level of the enable signal E and a special standby time need not be set.

Figure 3:
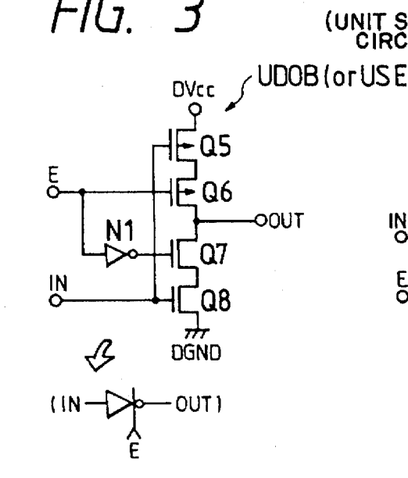
FIG. 3 is a circuit diagram illustrating another embodiment of a digital unit output circuit or a selector to a applied to the invention.

FIG. 3 is a circuit diagram of an other embodiment of the digital unit output circuit UDOB or a part of the selector SEL (unit selection circuit USEL).

In the embodiment, a CMOS circuit is used. That is, P-channel MOSFETs Q5, Q6 and N-channel MOSFETs Q7, Q8 are connected in series, and input signal IN is supplied to gate of the P-channel MOSFET Q5 and the N-channel MOSFET Q8, thereby the CMOS inverter circuit is constituted. The gate of the P-channel MOSFET Q5 is supplied with the enable signal E, and the gate of the N-channel MOSFET Q7 is supplied with the enable signal E inverted by the inverter circuit N1.

In the circuit of the embodiment, if the enable signal E is at a high level, since the P-channel MOSFET Q6 is turned off and output of the inverter circuit N1 becomes low level and the N-channel MOSFET Q7 is turned off, the output goes to the high impedance state. Consequently, in the use as the digital unit output circuit UDOB, similar operation to that of the embodiment in FIG. 2 can be effected. Also in the use as the selector SEL, the two circuits as above described are installed and the input signal IN is connected commonly to output of the palette memory PLM, and output OUT of one circuit may be connected to input of the digital/analog converter DAC and the output OUT of the other circuit may be connected to the input of the digital output circuit DOB. In this constitution, data of the palette memory PLM can be transmitted to the circuit which is rendered to the operation state in response to the enable signal E. The above-mentioned constitution will be described later using FIG. 7.

Figure 4:
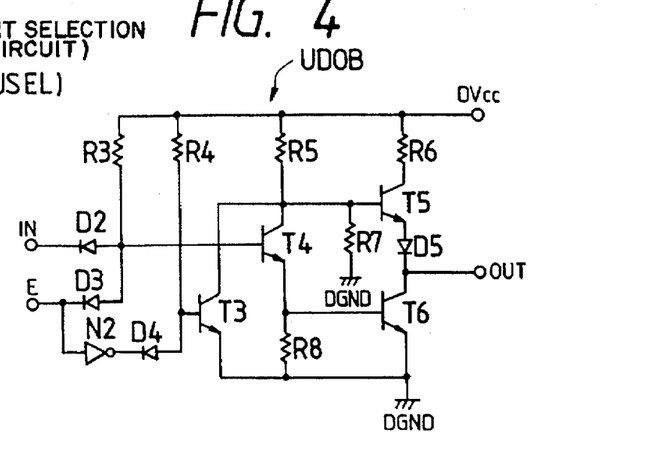
FIG. 4 is a circuit diagram illustrating yet another embodiment of a digital unit output circuit to be applied to the invention.

FIG. 4 is a circuit diagram of yet another embodiment of the digital unit output circuit UDOB.

In the embodiment, a diode transistor logic (DTL) circuit is utilized. That is, diodes D2, D3 and D4 and resistors R3 and R4 constitute input logic parts respectively. Output of the logic part composed of the diodes D2 and D3 and the resistor R3 is supplied to the base of a transistor T4, and collector output of the transistor T4 is supplied to the base of an output transistor T5 at the power source voltage side of the totem pole type. Emitter output thereof is supplied to the base of an output transistor T6 at the ground potential side. The enable signal E is supplied through an inverter circuit N2 to input of the logic part composed of the diode D4 and the resistor R4. Output of the logic part is supplied to the base of a transistor T3, and the transistor T3 forcibly makes the collector output of the output transistor T4 to be the ground potential DGND thereby the output transistor T5 is turned off.

In the circuit of the embodiment, if the enable signal E is made low, the diode D3 is turned on and the transistor T4 is turned off. Thereby the output transistor T6 is also turned off. The output signal of the inverter circuit N2 becomes high in response to the low level of the enable signal E, and the diode D4 is turned off. Consequently, the transistor T3 is turned on and collector of the drive transistor T4 is made the low level of the ground potential, thereby the output transistor T5 is also turned off. Thereby in the non-operation state where the enable signal E is made low, the output terminal OUT is put into the high impedance state and the consumed current becomes only current flowing through the resistors R2 and R3 resulting in the low consumption power.

When the enable signal E is high, the diode D3 is turned off and the output signal of the inverter circuit N2 becomes low and the diode D4 is turned on, thereby the transistor T3 is turned off. Consequently, in response to high level/low level of the input terminal IN, the output transistors T6/T5 are turned on and the output signal of low level/high level is formed.

Figure 5:
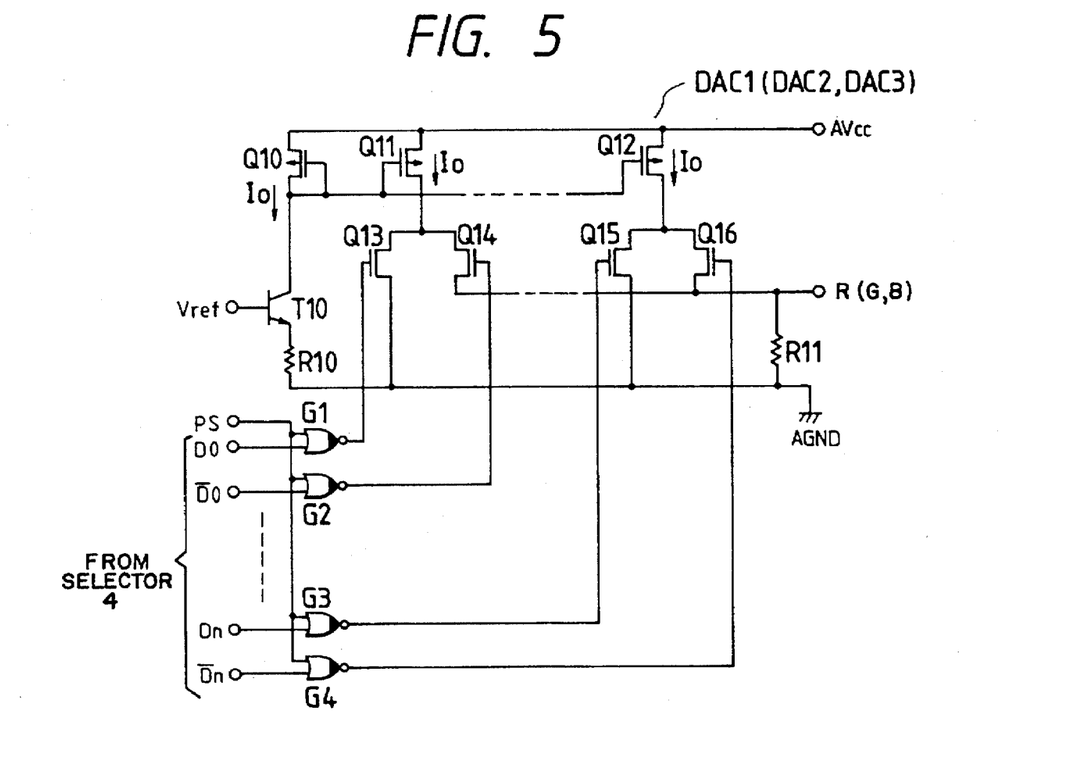
FIG. 5 is a circuit diagram illustrating an embodiment of a digital/analog converter to be applied to the invention.

FIG. 5 is a circuit diagram of an embodiment of the digital/analog converter DAC1 (DAC2, DAC3).

In the digital/analog converter DAC1 of the embodiment, the reference voltage Vref is formed by an operational amplifier (OP Amp) or the like (not shown), and supplied to the base of a transistor T10, and the reference current Io is formed from the collector of the transistor T10. An emitter resistor R10 is installed to the emitter of the transistor T10. The current Io is made the drain current of P-channel MOSFET Q10 in diode form. P-channel MOSFETs Q11 through Q12 as representative examples are connected in current mirror form to the MOSFET Q10. Although not particularly limited thereto, size ratio of the MOSFETs Q11, Q12 to the MOSFET Q10 is set equal. In this manner, the same reference current Io flows from respective drains of each of the MOSFETs Q11, Q12 exemplified.

Two pairs of N-channel MOSFETs Q13, Q14 and Q15, Q16 acting as current changeover switches are installed to the drain of each of the definite current MOSFETs Q11, Q12. The source of the MOSFETs Q13, Q15 on one side as the changeover switch is connected to the analog ground potential AGND, and the source of the MOSFETs Q14, Q16 on the other side is commonly connected to the output terminal OUT. A load resistor R11 is installed between the output terminal OUT and the analog ground point AGND. AVcc is made the analog power source potential.

The gates of the MOSFETs Q13, Q14 are supplied with output signals of NOR gate circuits G1 and G2 as hereinafter described. Digital signals D0, $\overline{D0}$ are supplied to one input of the NOR gate circuits G1 and G2. The gate of the MOSFETs Q15, Q16 are supplied with output signal of similar NOR gate circuits G3 and G4. Digital signals D5, $\overline{D5}$ are supplied to one input of the NOR gate circuits G3 and G4. Power control (enable) signal PS is commonly supplied to the other input of the NOR gate circuits G1 through G4. Operation of the digital/analog converter of the embodiment is different from that where so-called binary digital signals are converted into analog signals, and analog signals for the gradation display of 6 bits are formed by color data of 6 bits. That is, since each of the MOSFETs Q11, Q12 makes the same current Io flow, if signals of logic "1" exist in m bits ($m \leq n$) among the digital signals D0–D5, the reference currents Io are added corresponding to m bits. Thereby the current of mIo flows through the resistor R11 and voltage signal AR, AG or AB is formed. Signals corresponding to logic "0" among the digital signals D0–D5 make the current Io flow to the ground potential side of the circuit as the MOSFETs Q13, Q15 coupled to the ground potential side are turned on.

When the color data D0–D5 are binary digital signals, the constant-current MOSFETs Q11 through Q12 are supplied with binary weighting. For example, if the constant-current MOSFET Q11 corresponding to the least significant bit makes the constant current Io ($\times 2^0$) flow, the constant-current MOSFET corresponding to lower second bit makes the constant current $2^1 \times$ Io flow, and further the binary weighting of $2^2, 2^3 \ldots 2^5$ with respect to the current Io is effected.

Figure 6:
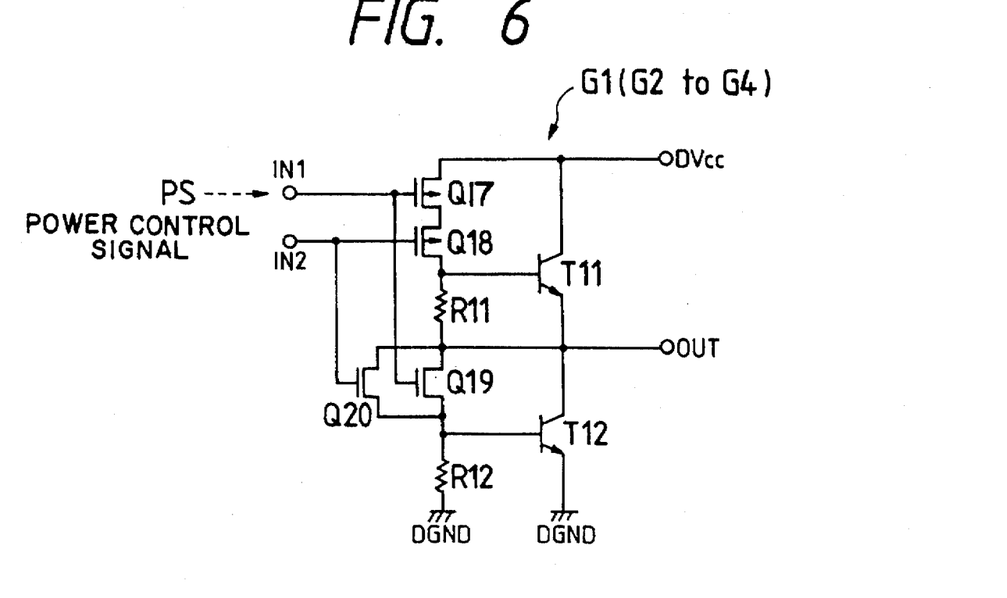
FIG. 6 is a circuit diagram illustrating an embodiment of a NOR gate circuit of bipolar CMOS type.

FIG. 6 is a circuit diagram of an embodiment of the NOR gate circuit G1 (G2–G4) in FIG. 5.

In the NOR gate circuit G1 of the embodiment, a CMOS NOR gate circuit comprising P-channel MOSFETs Q17, Q18 in series and N-channel MOSFETs Q19, Q20 in parallel are arranged at the input side, and quasi-complementary pushpull output transistors T11, T12 are installed at the output side. In the CMOS NOR gate circuit, in order to drive the transistors T11, T12 by its output, resistors R11 and R12 are connected respectively to the series P-channel MOSFETs Q17, Q18 and the parallel N-channel MOSFETs Q19, Q20. An output signal to drive the transistors T11, T12 is obtained from each of the resistors R11 and R12.

In the NOR gate circuit G1, when the power control signal PS is inputted to one input IN1, if the signal PS is made a high level, since the P-channel MOSFET Q17 is turned off and supply of the base current is interrupted, both transistors T11 and T12 are turned off. Consequently, the changeover switches MOSFETs Q13, Q14 through Q15, Q16 of the digital/analog converter are turned off thereby the constant current Io does not flow. Consequently, when the digital/analog converter DAC1 is rendered to the non-operation state, the consumption power of the digital/analog converter DAC1 is made the consumption power of the bias circuit (the operation amplifier) to form the constant voltage Vref and the constant current Io is flowing through the constant-current transistor T10 only, thereby the converter DAC1 is put into the low consumption power mode.

In the embodiment, the current switch part of the digital/analog converter is turned off and low consumption power is obtained, and the bias circuit (operational amplifier) used to form the constant voltage Vref makes only small current such as the reference current Io flow. This is in comparison to the current flowing through the analog converter during the operation state. In this constitution, during transfer to the operation state, the standby time need not be set and the operation rise can be made at a high speed.

When the digital/analog converters of 4 bits are used in three channels such as DAC1 through DAC 3, and since current consumed in the current changing portion to form the analog signals is about 78 mA and the current Io of the constant-current transistor T10 is about 2.5 mA being about 1/30 of the current consumed there, adopting the above-mentioned constitution can realize low consumption power in the non-operation state and high speed in the rise to the operation state.

In the NOR gate circuits G1–G4 to realize the low consumption power of the current changing portion as above described, since the output stage is constituted using the bipolar transistors, the high speed of the converting operation can be intended at the operation state. That is, the output load capacity of the NOR gate circuits G1–G4 is charged and discharged at high speed by the bipolar transistors at the output stage.

Figure 7:
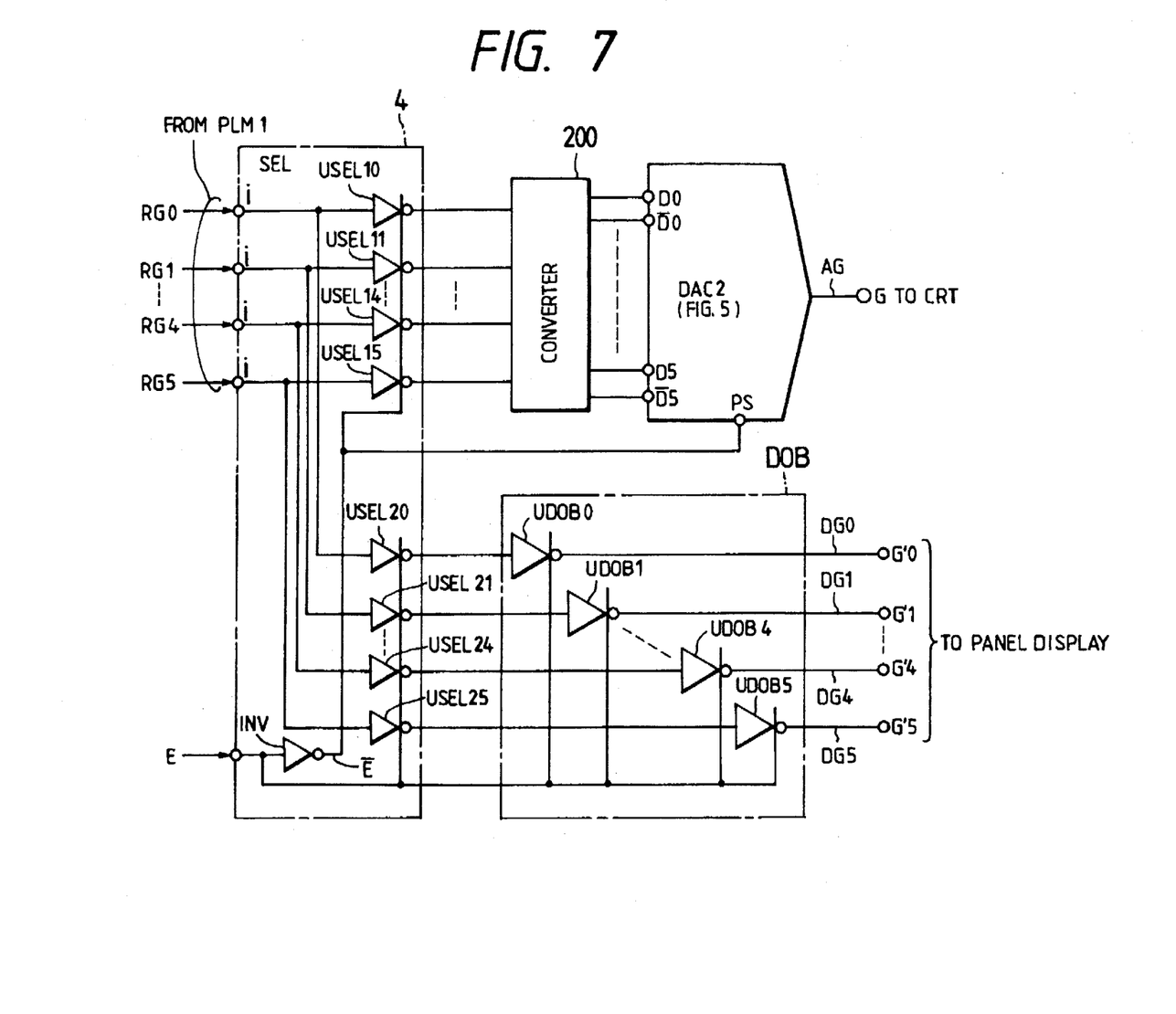
FIG. 7 is a circuit diagram illustrating an embodiment of a selector, a digital output circuit and a digital/analog circuit according to the invention.

FIG. 7 is a circuit diagram of an embodiment of the selector SEL 4, the digital/analog converter DAC2 and the digital output circuit DOB. FIG. 7 shows the part related to the read green information RG0–RG5 from the palette memory PLM 1 as an example. It will be easily understood that similar constitution can be made also regarding the read red and blue information RR, RB.

The selector SEL 4 at its input terminals i receives the digital color information RG0–RG5 supplied from the palette memory PLM 1, and supplies the color information RG0–RG5 to either the digital/analog converter DAC2 or the output circuit DOB. Consequently, the selector 4 includes analog unit selection circuits USEL 10–15 and digital unit selection circuits USEL 20–25.

Each of the analog unit selection circuits USEL 10–15 can be constituted by the circuit shown in FIG. 3, and control gates thereof are commonly connected so as to receive signal $\overline{E}$ in opposite phase of the enable signal E through an inverter circuit INV. On the other hand, each of the digital unit selection circuits USEL 20–25 can be also constituted by the circuit shown in FIG. 3, and control gates thereof are commonly connected so as to receive the enable signal E or signal in the same phase.

The digital/analog converter DAC2 is constituted by the circuit shown in FIG. 5, and is connected so that the opposite phase signal $\overline{E}$ of the enable signal E is supplied to the power control terminal PS.

The output circuit DOB includes unit output circuits UDOB 1–5, and respective unit output circuits UDOB 1–5 are constituted by the circuit shown in FIG. 3, and control gates thereof receive the enable signal E or signal in the same phase.

If the enable signal E is made high, the unit selection circuits USEL 20–25 and the unit output circuits UDOB 0–5 are rendered to the non-operation state, and each output terminal is made the high impedance state and digital color signals from the digital output terminals G'0–G'5 are made the output inhibit state. On the other hand, the unit selection circuits USEL 10–15 are rendered to the operation state, since signals of low are supplied to control gates thereof. Further, the digital/analog converter is also rendered to the operation state, since a low signal is supplied to the power control terminal PS. Consequently, the digital color information RG0–RG5 supplied from the palette memory PLM 1 is inputted through the corresponding unit selection circuits USEL 10–15 and the converter 200 to the input terminals D0, $\overline{D0}$–D11, $\overline{D11}$ of the analog/digital converter DAC2. The digital/analog converter DAC2 responds to input signals and outputs the analog color signal AG following the input signals to the external terminal G.

On the other hand, if the enable signal E is made low, outputs of the unit selection circuits USEL 10–15 are made the high impedance state and digital/analog converter DAC2 is rendered to the non-operation state. On the other hand, since the unit selection circuit USEL 20–25 and the unit output circuits UDOB 1–5 are rendered to the operation state, the digital color information RG0–RG5 supplied from the palette memory PLM 1 is supplied to the color output terminals G'0–G'5.

The converter 200 in FIG. 7 shows a circuit for converting the digital color information RG0–RG5 into desired complemental signals D0, $\overline{D0}$–D5, $\overline{D5}$.

When the selector SEL 4 and the output circuit DOB shown in FIG. 7 are installed corresponding to each digital color information RR, RG, RB of the palette memory PLM, since all digital outputs of 18 bits of the palette memory PLM can be outputted from the external terminals R'0–R'5, G'0–G'5 and B'0–B'5 of the color palette device CPLT, when the color liquid crystal display is driven, more color gradation display becomes possible and more color display becomes possible. Among the digital color information RR, RG, RB each in 6 bits, when the digital color information of each one bit, for example, RR0, RG0, RB0 of 3 bits only are outputted, in FIG. 7, it will be easily understood that the improvement may be performed so that the unit selection circuits USEL 21–USEL 25 and the unit output circuits UDOB 1–UDOB 5 are rendered to the non-operation state. In monochromatic liquid crystal or plasma display, in general, the gradation display is performed using data of the digital green information DG0–DG5. Consequently, it will be easily understood that the improvement may be performed so that outputs of all bits or arbitrary bits of the digital green information DG0–DG5 can be obtained.

Figure 8:
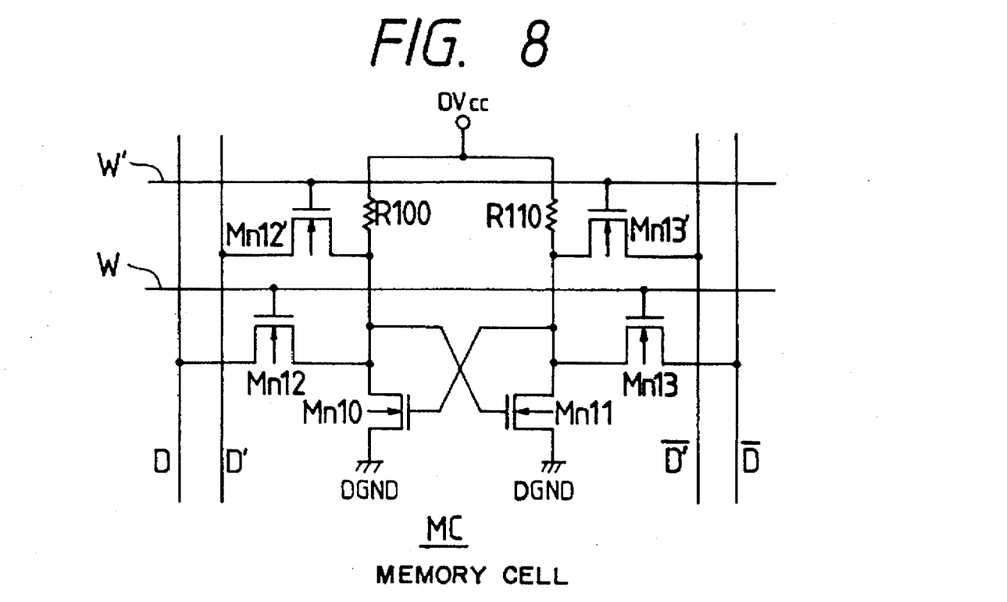
FIG. 8 is a circuit diagram of a 2-port static memory cell constituting a palette memory included in a color palette device of the invention.

Regarding the palette memory PLM 1, the bipolar CMOS static RAM technology, for example, U.S. Pat. No. 4,731,796 assigned to Hitachi, Ltd. and issued on Dec. 15, 1987, can be utilized. However, each memory cell in the palette memory PLM 1 is made as shown in FIG. 8. That is, a static memory cell MC comprises N-channel type drive MOSFETs Mn 10 and 11 with their gates and drains in cross coupling and with each source coupled to the ground terminal DGND. Resistor elements R100 and R110 made of polycrystalline silicon are installed between each drain of the drive MOSFETs Mn 10 and 11 and the power source terminal DVcc respectively. A pair of N-channel type first transfer MOSFETs Mn 12 and 13 with their source-drain paths connected between a first complementary data line pair D, $\overline{D}$ and respective drains of the drive MOSFETs Mn 10 and 11 and with their gates coupled to a first word line, and a pair of N-channel type second transfer MOSFETs Mn 12' and 13' with its source-drain paths connected between a second complementary data line paid D', $\overline{D}'$ and drains of the drive MOSFETs Mn 10 and 11 and with their gates coupled to a second word line. In this constitution of the memory cell, since the resistor elements R100 and R110 are made using polycrystalline silicon, the are of each memory cell is reduced. It will be easily understood that the resistor elements R100 and R110 respectively can be changed into P-channel type MOSFETs.

The first word line W and the first complementary data line pair D, $\overline{D}$ of the static memory cell MC in FIG. 8 are made the selection state by the control logic LOG, and data stored in the memory cell MC are amplified by a first sense amplifier and a second main amplifier of differential bipolar type coupled to the first complementary data line pair D, $\overline{D}$ and supplied to the selector SEL 4. The second word line W' and the second complementary data line paid D', $\overline{D}'$ of the memory cell MC are made the selection state by the control circuit CONT. When data is written in the memory cell MC, potential of the second complementary data line paid D', $\overline{D}'$ is made low and high (or high and low) respectively by a write amplifier coupled to the second complementary data line pair D', $\overline{D}'$, and the second transfer MOSFETs Mn 12' and 13' are turned on by the second word line W' of the selection level, thereby data supplied to the external terminal D0 (–D7) is written in the memory cell MC. On the other hand, a second sense amplifier and a second main amplifier of differential bipolar type are coupled to the second complementary data line pair D', D', and data in the memory cell MC is read through the second complementary data line pair D', D' to the external terminal D0 (–D7). Regarding the above-mentioned technology, U.S. patent application (Ser. No. net yet arrived) filed on May 3, 1989 and Korea Patent Application No. 1989-6175 filed on May 9, 1989, both based on Japanese Patent Application No. 63-115183 filed on May 11, 1988 by one of the present inventors can be used for reference.

Figure 9:
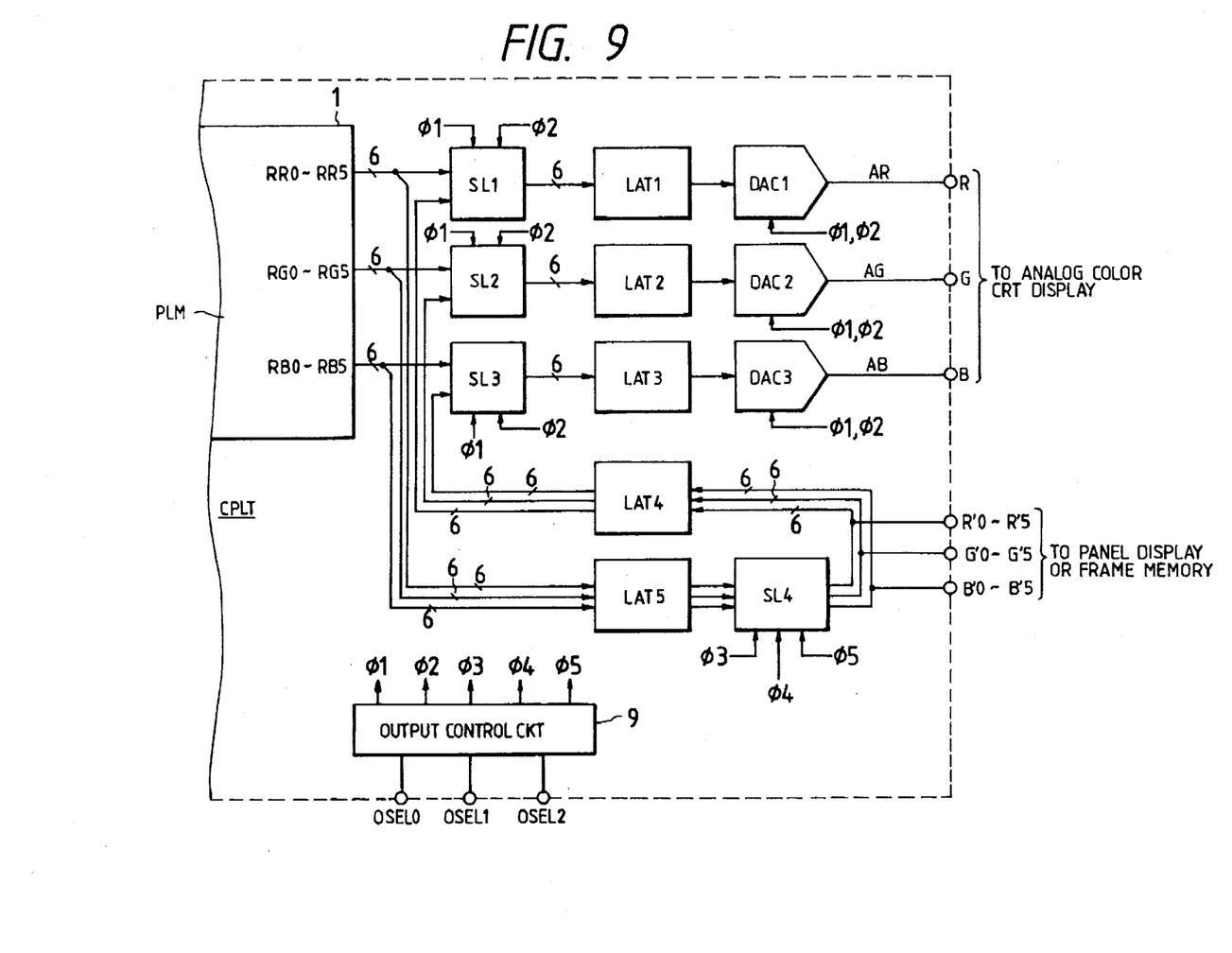
FIG. 9 is a block diagram of main part of a palette device according to another embodiment of the invention.

FIG. 9 is a block diagram of a main part of a color palette device as another embodiment of the invention, and other parts are deemed to be the same as those in the color palette device shown in FIG. 1(b).

The color palette device CPLT in FIG. 9 includes three external terminals OSEL 0, 1 and 2 for inputting output control signals, and finer control of output signals of the color palette device CPLT become possible. The external terminals OSEL 0, 1 and 2 are coupled to an output control circuit 9, which makes any one of control signals φ1–φ5 be a low level selectively based on the potential state of the terminals OSEL 0, 1 and 2.

If the control signal φ1 is made low (the control signal φ2 is made high level), selection circuits SL 1, 2 and 3 are controlled so that digital color data RR0–RR5, RG0–RG5, RB0–RB5 supplied from the palette memory PLM 1 are supplied through latch circuits LAT 1, 2 and 3 to inputs of digital/analog converters DAC 1, 2 and 3. The digital/analog converters DAC 1, 2 and 3 are rendered to the operation state by the low level of the control signal $\phi 1$, and convert digital color data supplied through the selection circuits SL 1, 2 and 3 into analog color signals AR, AG and AB and supply the converted signals to the external terminals R, G and B. On the other hand, since the control signals $\phi 3$, $\phi 4$ and $\phi 5$ are made high, output of the selection circuit SL 4 is made the high impedance state. That is, the operation mode to make the control signal $\phi 1$ low is the mode that the digital color data of 18 bits in the palette memory PLM 1 are subjected to analog conversion using the digital/analog converters DAC 1, 2 and 3 and outputted. In this case since the memory capacity of the palette memory PLM is 256 words×18 bits, 256 colors can be simultaneously displayed on the analog CRT display.

If the control signal $\phi 2$ is made low ($\phi 1$ is made high), the selection circuits SL 1, 2 and 3 are controlled so that the external digital color data (digital red, green and blue information each in 6 bits) supplied through the latch circuit LAT 4 to the external terminals R'0–R'5, G'0–G'5, B'0–B'5 are supplied through the latch circuits LAT 1, 2 and 3 to inputs of the digital/analog converters DAC 1, 2 and 3. The digital/analog converters DAC 1, 2 and 3 are rendered to the low level of the control signal $\phi 2$, and convert the external digital color data supplied through the selection circuits SL 1, 2 and 3 into analog color signals AR, AG and AB ad supply the converted signals to the external terminals R, G and B. On the other hand, since the control signals $\phi 3$, $\phi 4$ and $\phi 5$ are made high, output of the selection circuit SL 4 is made to the high impedance state. That is, the operation mode to make the control signal $\phi 2$ low is the mode that the digital red, green and blue data each in 6 bits supplied from the external terminals R'0–R'5, G'0–G'5, B'0–B'5 are converted into analog color signals AR, Ag and AB using the incorporated digital/analog converter and the converted signals are outputted. In this case since 260 thousands ($=2^{18}$) colors can be simultaneously displayed on the analog CRT display, finer color control on the analog CRT display becomes possible. Consequently, since color of pattern displayed on the analog color CRT display can be set to natural color, the expression ability regarding color can be improved. It will be easily understood that the external digital color data supplied to the external terminals R'0–R'5, G'0–G'5, B'0–B'5 can be prepared by connecting output of the frame memory or the like to these external terminals.

If the control signal $\phi 3$ is made low, the selection circuit SL 4 is controlled so that the digital color data RR2–RR5, RG2–RG5 and RB2–RB5 of 12 bits are selected among the digital color data RR0–RR5, RG0–RG5 and RB0–RB5 of 18 bits supplied from the palette memory PLM 1 through the latch circuit 5 and the selected data are supplied to the external terminals R'2–R'5, G'2–G'5 and B'2–B'5. In this case, since the control signals $\phi 1$ and $\phi 2$ are made high level, outputs of the selection circuits SL 1, 2 and 3 are made the high impedance state and the digital/analog converters DAC 1, 2 and 3 are rendered to the non-operation state.

If the control signal $\phi 4$ is made low, the selection circuit SL 4 is controlled so that the digital green data RB0–RG5 supplied from the palette memory PLM 1 through the latch circuit LAT 5 are supplied to the external terminals G'0–G'5. This operation mode is used in the case that a monochromatic liquid crystal or a plasma display is subjected to the gradation display. In this case, outputs of the selection circuits SL 1 through 3 are made the high impedance state by the control signals $\phi 1$ and $\phi 2$ of high, and the digital/analog converters DAC 1 through 3 are rendered to the non-operation state.

If the control signal $\phi 5$ is made low, the selection circuit SL 4 is controlled so that all digital color data of 18 bits supplied from the palette memory PLM through the latch circuit LAT 5 are supplied to the external terminals R'0–R'5, G'0–G'5 and B'0–B'5. Each operation to make the control signals $\phi 3$ and $\phi 5$ low is used in the case that a color liquid crystal display is subjected to the gradation display.

Figure 10:
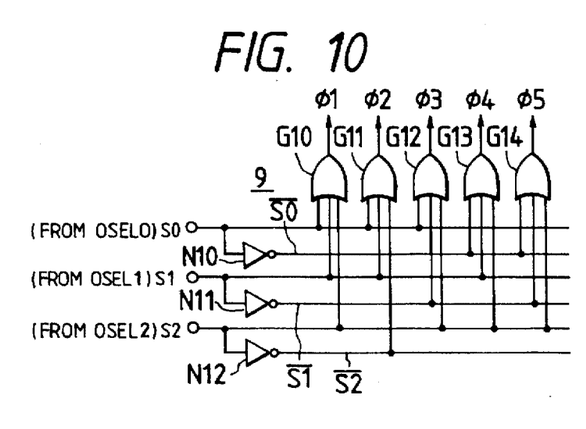
FIG. 10 is a circuit diagram illustrating an embodiment of an output control circuit in FIG. 9.

FIG. 10 shows an example of a circuit diagram of the output control circuit 9. The output control circuit 9 comprises 3-input OR gates G10 through G14 and inverters N10 through N12.

First through third inputs of the OR gate G10 are connected so as to receive selection signals S0 through S2 respectively supplied from the external terminals OSEL0 through OSEL2. Consequently, if the selection signals S0 through S2 are all made low, the gate 10 generates the control signal $\phi 1$ of low at its output.

First through third inputs of the OR gate G11 are connected so as to receive the selection signals S0 and S1 and inverted signal S2 of the selection signal S0 respectively. Consequently, if the selection signals S0 and S1 are made low and the selection signal S2 is made high, the gate G11 generates the control signal $\phi 2$ of low at its output.

First through third inputs of the OR gate G12 are connected so as to receive the selection signals S0 and S2 and inverted signal S1 of the selection signal S1 respectively. Consequently, if the selection signals S0 and S2 are made low and the selection signal S1 is made high, the gate G12 generates the control signal $\phi 3$ of low at its output.

First through third inputs of the OR gate G13 are connected so as to receive the selection signals S1 and S2 and inverted signal S0 of the selection signal S0 respectively. Consequently, if the selection signals S1 and S2 are made low and the selection signal S0 is made high, the gate G13 generates the control signal $\phi 4$ of low at its output.

First through third inputs of the OR gate G13 are connected so as to receive the selection signal S2 and the inverted signals S0 and S1 respectively. Consequently, if the selection signals S0 and S1 are made high and the selection signal S2 is made low, the gate G14 generates the control signal $\phi 5$ at its output.

Figure 11:
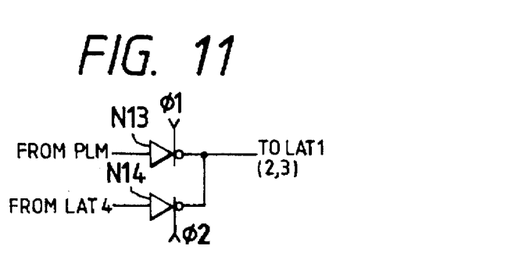
FIG. 11 is a circuit diagram illustrating an embodiment of the selection circuit SL1 in FIG. 9.

FIG. 11 shows a simplified main part of the selection circuits LAT1 through LAT3. The selection circuit is basically constituted by using a plurality of inverters as shown in FIG. 3. That is, the selection circuit comprises an inverter N13 having its input coupled to one output of the palette memory PLM, its output coupled to one input of the latch circuit LAT1 (LAT2 and LAT3), its control gate receiving the control signal $\phi 1$, an inverter N14 having its input coupled to one output of the latch circuit LAT4, its output coupled to the output of the inverter N13 and its control gate receiving the control signal $\phi 2$. In practice, it will be easily understood that the inverters N13 and N14 are necessary in 18 pieces respectively. The inverter N13 is rendered to the operation state in response to the low level of the control signal $\phi 1$, and its output is made the high impedance state in response to the high level of the control signal $\phi 1$. Also the inverter N14 is rendered to the operation state in response to the low level of the control signal $\phi 2$, and its output is made the high impedance state in response to the high level of the control signal $\phi 2$. Consequently, the inverter N13 supplies output signals of the palette memory PLM to the latch circuits LAT1 through LAT3 in response to the low level of the control signal φ1. On the other hand, the inverter N14 supplies output signals of the latch circuit LAT 4 to inputs of the latch circuits LAT1 through LAT3 in response to the low level of the control signal φ2.

Figure 12:
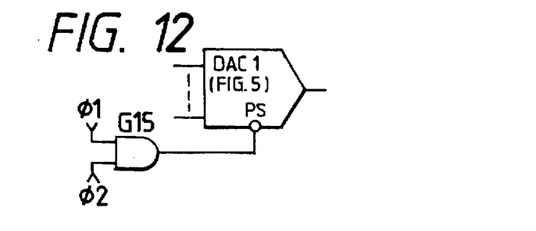
FIG. 12 is a diagram illustrating an operation/non-operation control circuit of a digital/analog converter in FIG. 9; and, FIG. 13 is a circuit diagram illustrating an embodiment of a selection circuit SL4 in FIG. 9.

FIG. 12 shows a control circuit of a digital/analog converter DAC1. The digital/analog converter DAC1 shown in FIG. 12 has the same circuit constitution as that shown in FIG. 5, and the power control terminal PS is connected to the output of an AND gate G15 receiving the control signals φ1 and φ2 at its inputs. Consequently, if any one of the control signals φ1 and φ2 is made low, the gate G15 generates a low level signal at its output and the digital/analog converter DAC1 is made operable. On the other had, if both the control signals φ1 and φ2 are made high, the gate G15 generates a high level signal and the digital/analog converter DAC1 is rendered to the non-operation state (low consumption power state).

Figure 13:
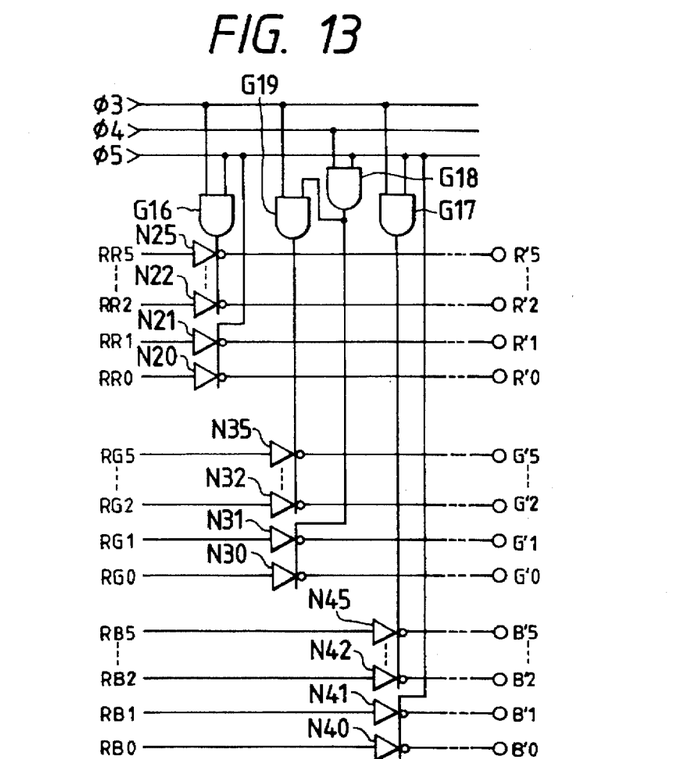

FIG. 13 shows a circuit diagram of an example of the selection circuit SL4. The selection circuit SL4 comprises inverters N20 through N25 whose inputs receive the digital red data RR0 through RR5 of the palette memory PLM 1 respectively and whose outputs are connected to the external terminals R'0 through R'5 respectively, inverters N30 through N35 whose inputs receive the digital green data RG0 through RG5 of the palette memory PLM1 respectively and whose outputs are connected to the external terminals G'0 through G'5 respectively, and inverters N40 through N45 whose inputs receive the digital blue data RB0 through RB5 of the palette memory PLM1 respectively and whose outputs are connected to the external terminals B'0 through B'5 respectively. Respective control gates of the inverters N22 through N25 and N42 through N45 are connected to outputs of the AND gates G16 and G17 whose inputs are coupled to receive the control signals φ3 and φ5 respectively. Control gates of the inverters N20, N21, N40 and N41 are coupled to receive the control signal φ5. Control gates of the inverters N30 and N31 are coupled to output of the AND gate G18 whose inputs receive the control signals φ4 and φ5 respectively. Control gates of the inverters N32 through N35 are coupled to output of the AND gate G19 whose inputs receive the control signal φ3 and output of the gate G18 respectively.

If the control signal φ3 is made low in an alternative way, since output signals of the gates G16, G17 and G19 are made low, the inverters N22 through N25, N32 through N35 and N42 through N45 are rendered to the operation state and data in accordance with the data RR2 through RR5, RG2 through RG5 and RB2 through RB5 are supplied to the corresponding external terminals.

If the control signal φ4 is made low in an alternative way, since output signals of the gates G18 and G19 are made low, the inverters N30 through N35 are rendered to the operation state and data in accordance with the digital green data RG0 through RG5 are supplied to the external terminals G'0 through G'5.

If the control signal φ5 is made low in an alternative way, since output signals of the gates G16 through G19 are all made low, all inverters N20 through N25, N30 through N35 and N40 through N45 are rendered to the operation state and data in accordance with the digital color data RR0 through RR5, RG0 through RG5 and RB0 through RB5 of 18 bits read from the palette memory PLM1 are supplied to the corresponding external terminals.

Effects obtained from the above-mentioned embodiments are as follows:

(1) A functional block is selectively rendered to a operation state in response to a operation mode, and when it is rendered to a non-operation state, at least an output circuit coupled to external terminals is put into a high output impedance state, i.e., the output circuit required to make a relatively large current flow is put into the high output impedance state, thereby low consumption of power at the non-operation state becomes possible.

(2) According to item (1), since the high function and the low consumption power are required in a laptop type personal computer or the like driven by a battery, a semiconductor integrated circuit device installed to such a computer and having plural functional blocks can be made favorable.

(3) In a color palette circuit device, an analog output circuit for a CRT color display and a digital output circuit for a panel display are installed, thereby various sorts of laptop type information processing apparatuses having diverse display output functions can be obtained in simple constitution.

(4) As a digital/analog converter installed in the color palette circuit device, a switch MOSFET for maintaining the operation state of only a bias circuit and a reference constant current generating circuit and for changing the reference current in response to the digital current at a non-operation mode is turned off, thereby the low consumption power is obtained and the rise during transfer from the non-operation state to the operation state becomes more rapid.

(5) Since the color palette circuit device can be utilized both when the analog color CRT display is driven and when the panel display is driven, change of color or gradation of pattern on these displays can be simply performed by only changing the color data in the color palette circuit device and therefore the device can be readily used.

The invention made by the present inventor has been specifically described based on the embodiments. However, the invention is not limited to the embodiments but various modifications can be performed without departing from the spirit and scope thereof. For example, in the color palette device of FIG. 1(a), regarding a circuit being not in use also in the palette memory, a circuit of interrupting the supply current may be installed. Also the selector is not particularly required but may be omitted.

In addition to the color palette circuit as above described, the invention can be applied also to various systems driven by the battery such as a laptop type personal computer as above described, for example, to various functional blocks installed to a floppy disk memory drive device or a hard disk memory drive device.

The invention can be widely applied, in addition to the color palette circuit as above described, to a semiconductor integrated circuit device having plural functional blocks where the operation is selectively performed in response to the operation mode.

Effects obtained from the typical invention disclosed in the present patent application will be briefly described as follows. A functional block is selectively rendered to the operation state in response to the operation mode, and when it is rendered to the non-operation state, at least an output circuit coupled to external terminals is put into the high output impedance state, thereby the output circuit required to make a relatively large current flow is put into the high output impedance state and low consumption power at the non-operation state becomes possible.

What is claimed is:

1. A color palette semiconductor integrated circuit device on a semiconductor substrate used to provide red, green and blue analog color signals to an analog color display, and for use with a frame memory, the device comprising:

first to third digital to analog converters each having inputs and an output;

a first external analog terminal coupled to the output of the first digital to analog converter;

a second external analog terminal coupled to the output of the second digital to analog converter;

a third external analog terminal coupled to the output of the third digital to analog converter;

external address input terminals to which address data are to be supplied from the frame memory;

a memory circuit coupled to the external address input terminals and accessed by the address data, the memory circuit having memory capacity of a predetermined number of words defined by the number of the address data, each word defining color of one pixel to be displayed on a screen of the analog color display and containing first digital data of a plurality of bits for red color, second digital data of a plurality of bits for green color, and third digital data of a plurality of bits for blue color;

external data terminals, which are greater in number than the number of the external address input terminals, and to which digital color data are to be supplied from outside of the color palette semiconductor integrated circuit device;

a selector having first inputs coupled to outputs of the memory circuit to receive the first to third digital data, respectively, second inputs coupled to the external data terminals and first outputs coupled to the inputs of the first to third digital to analog converters, respectively; and, a control circuit coupled to the selector and responsive to mode control data and controlling an operation of the selector so as to bring the selector into a first mode or a second mode, where the first mode enables the selector to couple the first inputs thereof to the first outputs thereof, and is defined as a mode where the number of colors, corresponding to the number of the words in the memory circuit, are displayed simultaneously on the screen of the analog color display, and where the second mode enables the selector to couple the second inputs thereof to the first outputs thereof, and is defined as a mode where the number of colors corresponding to the nth power are displayed simultaneously on the screen of the analog color display, where n is the number of the external data terminals;

wherein, in the first mode, the memory circuit is accessed by address data supplied thereto in synchronization with a display timing and supplies the first to third digital data included in one word corresponding to the supplied address data to the inputs of the first to third digital to analog converters, respectively, via the selector so that the first to third digital to analog converters convert the first to third digital data into red, green and blue analog color signals, respectively, and provide the converted red, green and blue analog color signals to the first to third external analog terminals, respectively, and wherein, in the second mode, the first to third digital to analog converters receive at the inputs thereof the digital color data via the selector so that the first to third digital to analog converters convert the digital color data into red, green and blue analog color signals, respectively, and provide the converted red, green and blue analog color signals to the first to third external analog terminals, respectively.

2. A color palette semiconductor integrated circuit device according to claim 1, wherein the external data terminals are coupled to a color liquid crystal display;

wherein the selector having second outputs coupled to the external data terminals, such that the external data terminals enable the color liquid crystal display to display a gradation based on the first to third digital data supplied via the second outputs, and wherein the control circuit responsive to the mode control data controlling an operation of the selector so as to bring the selector into a third mode, such that the third mode enables the selector to couple the first inputs thereof to the external data terminals via the second outputs thereof.

3. A color palette semiconductor integrated circuit device according to claim 2, wherein the first to third digital to analog converters are put into a non-operation state when the control circuit indicates the third mode by the mode control data.

4. A color palette semiconductor integrated circuit device according to claim 2, wherein, in the third mode, the first to third digital to analog converters is provided a current for operating thereof by a control signal supplied from the control circuit.

5. A color palette semiconductor integrated circuit device according to claim 2, wherein the memory circuit includes a decoder which is coupled to the external address input terminals and receives the address data output from the frame memory and selects one word corresponding thereto in the first mode.

6. A color palette semiconductor integrated circuit device according to claim 5, further comprising:

means coupled to the memory circuit for changing the first to third digital data contained in a selected word to new data.

7. A color palette semiconductor integrated circuit device on a semiconductor substrate used to provide red, green and blue analog color signals to an analog color display, and for use with a first or a second frame memory, the device comprising:

first to third digital to analog converters each having inputs and an output;

a first external analog terminal coupled to the output of the first digital to analog converter;

a second external analog terminal coupled to the output of the second digital to analog converter;

a third external analog terminal coupled to the output of the third digital to analog converter;

external address input terminals to which address data are to be supplied from the first frame memory;

a memory circuit coupled to the external address input terminals and accessed by the address data, the memory circuit having memory capacity of a predetermined number of words defined by the number of the address data, each word defining color of one pixel to be displayed on a screen of the analog color display and containing first digital data of a plurality of bits for red color, second digital data of a plurality of bits for green color, and third digital data of a plurality of bits for blue color;

external data terminals, which are greater in number than the number of the external address input terminals, and to which digital color data are to be supplied from the second frame memory;

a selector having first inputs coupled to outputs of the memory circuit to receive the first to third digital data, respectively, second inputs coupled to the external data terminals, first outputs coupled to the inputs of the first to third digital to analog converters, respectively, and second outputs coupled to the external data terminals; and a control circuit coupled to the selector and responsive to mode control data and controlling an operation of the selector so as to bring the selector into a first mode, a second mode or a third mode, where the first mode enables the selector to couple the first inputs thereof to the first outputs thereof, and is defined as a mode where the number of colors, corresponding to the number of the words in the memory circuit, are displayed simultaneously on the screen of the analog color display, where the second mode enables the selector to couple the second inputs thereof to the first outputs thereof, and is defined as a mode where the number of colors corresponding to 2 to the nth power are displayed simultaneously on the screen of the analog color display, where n is the number of the external data terminals, and where the third mode enables the selector to couple the first inputs thereof to the external data terminals via the second outputs thereof;

wherein, in the first mode, the memory circuit is accessed by address data supplied thereto in synchronization with a display timing, and supplies the first to third digital data included in one word corresponding to the supplied address data to the inputs of the first to third digital to analog converters, respectively, via the selector so that the first to third digital to analog converters convert the first to third digital data into red, green and blue analog color signals, respectively, and provide the converted red, green and blue analog color signals to the first to third external analog terminals, respectively;

wherein, in the second mode, the first to third digital to analog converters receive at the inputs thereof the digital color data via the selector so that the first to third digital to analog converters convert the digital color data into red, green and blue analog color signals, respectively, and provide the converted red, green and blue analog color signals to the first to third external analog terminals, respectively, and wherein, in the third mode, the selector outputs the first to third digital data supplied from the first inputs thereof to the external data terminals via the second outputs thereof.

8. A color palette semiconductor integrated circuit device according to claim 7, wherein the first to third digital to analog converters are put into a non-operation state when the control circuit indicates the third mode by the mode control data.

9. A color palette semiconductor integrated circuit device according to claim 7, wherein, in the third mode, the first to third digital to analog converters is provided a current for operating thereof by a control signal supplied from the control circuit.

* * * * *

UNITED STATES PATENT AND TRADEMARK OFFICE
CERTIFICATE OF CORRECTION

PATENT NO. : 5,673,058
DATED : September 30, 1997
INVENTOR(S) : Akira Uragami et al.

It is certified that error appears in the above-indentified patent and that said Letters Patent is hereby corrected as shown below:

Claim 5, line 2, delete "claim 2" and insert therefor--claim 3--.

Signed and Sealed this

Fourteenth Day of April, 1998

Attest:

BRUCE LEHMAN

Attesting Officer

Commissioner of Patents and Trademarks